United States Patent Office 3,472,083
Patented Oct. 14, 1969

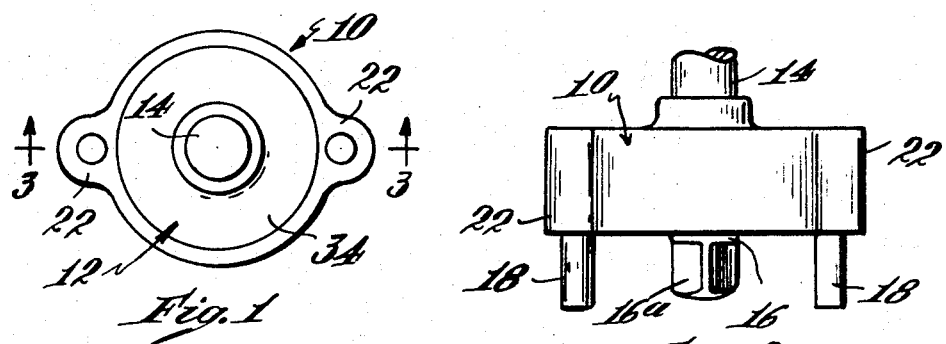
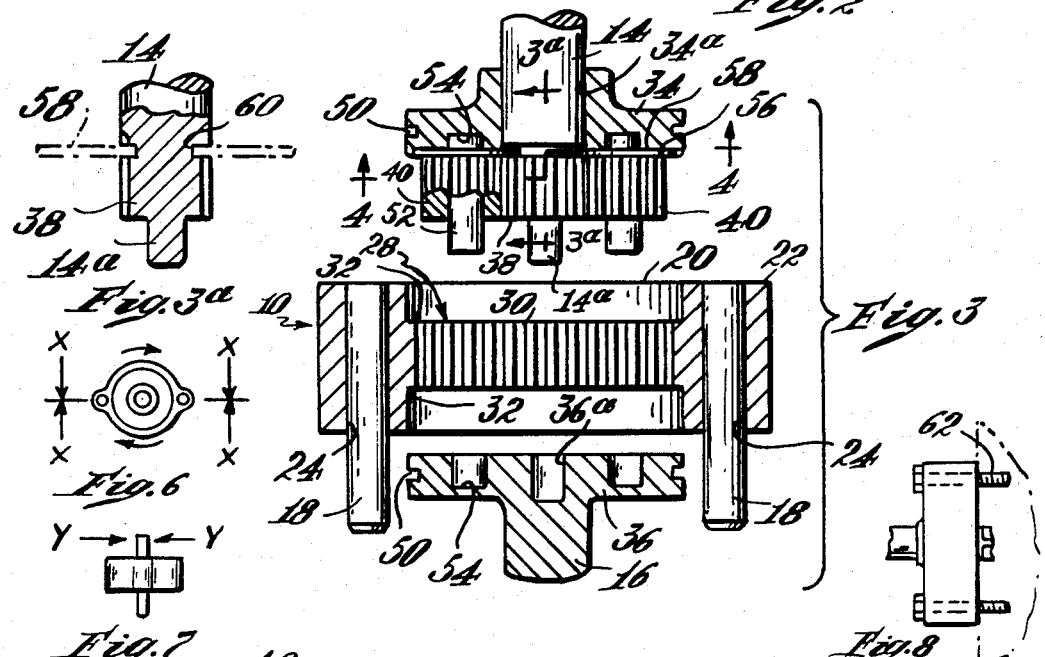
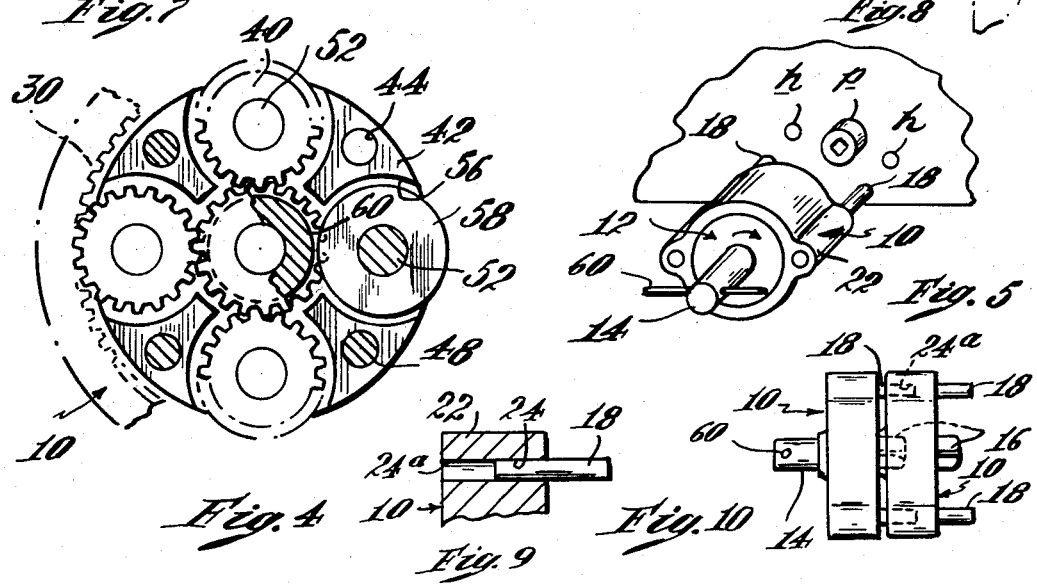

3,470,083
TORQUE WRENCH
Lawrence S. Schnepel, 250 Goodman Hill Road,
Sudbury, Mass. 01776
Filed Oct. 25, 1967, Ser. No. 678,027
Int. Cl. B25b 17/02; F16h 1/32, 57/02
U.S. Cl. 74—801                                    7 Claims

ABSTRACT OF THE DISCLOSURE

A torque transmitting tool having rotary input and output shafts connected by planetary gearing whereby rotary force of a predetermined amount applied to one shaft at a predetermined speed will produce a rotary force of predetermined different amount and/or predetermined different speed of the output shaft.

Background of the invention

In my United States Patent 2,510,483, dated June 6, 1950, for Speed and Power Gearing Hand Wrench, there is illustrated a torque transmitting tool comprising a holder or cage mounting the shafts and the planetary gearing. For constraining the holder during transmission of the torque from one shaft to the other there is provided a handle extending radially therefrom with respect to the axis of the input and output shafts which is adapted, by engagement with a part of a machine or structure, to prevent rotation of the holder. Similar devices and tools are shown in the Cranston patent, 1,417,503, Christian patent, 2,407,975, Yannes patent, 1,721,612 and Zellers patent, 721,930. These patents have in common, as does the Schnepel patent, a single, radially disposed handle or part for preventing rotation of the tool during the application of the torque. The effect of the single handle for resisting the applied torque is to apply an eccentric load and hence side thrust to the gearing and this in turn produces serious wear of the gearing, reduces the efficiency of the transmission, and sometimes results in accidental disengagement or injury to the millwright. In addition, the absence of any means other than the output shaft for resisting the bending moment applied by application of the turning moment to the input shaft results in skewing the gears and this in turn results in wear and loss of efficient transmission of the applied input. The purpose of this invention accordingly is to eliminate the unequal and non-uniform loading of the gears and in turn to minimize wear, increase efficiency and reduce damage or injury incident to the use of the tool. Other objects are to provide improvements in construction which afford economies in manufacture and which enable cascading two or more such devices to provide means for obtaining a larger torque than is available with a single device of predetermined size without having to obtain a device of larger size and/or to obtain higher torque ratios.

Summary

As herein illustrated, the device comprises a stator which serves as a holder or cage, a rotor which in conjunction with the stator provides multiplying means, coaxially mounted input and output shafts operably connected by the multiplying means, and means on the holder for mounting and constraining the tool in non-rotating relation to the part to which the torque is to be applied comprising bearing members located on the holder at diametrically opposite sides of the axis of the shafts and at equal radial distances therefrom for interengagement with complementary bearing members provided on the structure with which it is associated. The aforesaid means comprise a pair of pins fixed to the holder with their axes spaced from and parallel thereto and projecting from the holder in the same direction as the output shaft. The cross-sections of the pins perpendicular to their longitudinal axes are of such diameter as to resist turning and/or tilting of the holder relative to the axis of the shafts. The stator is annular and contains an internal gear and the rotor comprises a pair of axially spaced discs journaled in the stator for rotation about the axis of the shafts. One of the shafts is journaled for rotation at the center of one of the discs, extends through it into the space between the discs and has on it a spur gear. The other shaft is fixed centrally to the outer side of the other disc and the latter has mounted on its inner side within the space between the discs a plurality of planetary gears which mesh, respectively, with the spur gear and the internal gear. The discs contain holes surrounding the axis of the shafts which support the spur gear which removably support shafts on which the planetary gears are mounted, and there are locking elements mounted on a pair of diametrically opposed shafts having parts projecting into an annular groove adjacent one end of the spur gear.

To enable cascading two or more such devices the stator may be provided with diametrically arranged holes situated at the same radial distance from the axis of the shafts as the pins for receiving the pins of another such device. These holes may be parts of the same holes in which the pins are situated or differently located holes. When thus modified the input shaft will be designed to non-rotatably receive the output shaft of the device to be mounted on it.

Th invention will now be described in greater detail with reference to the accompanying drawings wherein:

FIG. 1 is a plan view of the tool;
FIG. 2 is an elevation of the tool;
FIG. 3 is an exploded view of the tool with the parts separated on the axis of the input and output shafts and with parts shown in section;
FIG. 3a is a fragmentary section taken on the line 3a—3a of FIG. 3;
FIG. 4 is a view taken on the line 4—4 of FIG. 3;
FIG. 5 is an isometric showing a tool as it would be used to turn a threaded fitting containing a non-circular recess for receiving the non-circular end portion of the output shaft and showing holes for receiving the tool supporting bearing pins;
FIG. 6 diagrammatically shows the effect of the turning moment;
FIG. 7 diagrammatically shows the effect of the bending moment;
FIG. 8 is an elevation, partly in section, showing a device with the mounting pins omitted and bolts provided for mounting it in operative position;
FIG. 9 is a fragmentary diametrical section through one of the holes provided for receiving a mounting pin showing the pin aborted so that part of the hole is empty; and
FIG. 10 is an elevation of two devices cascaded.

Referring to the drawings, the tool comprises a stator 10, a rotor 12, coaxially arranged input and output shafts 14 and 16 and bearing means 18 on the stator for mounting and constraining the tool for use. The stator 10 provides a holder or cage for the component parts of the tool, is annular in form and has a circular opening 20 within which the rotor 12 is journaled for rotation about the axis of the shafts 14 and 16, and diametrically disposed, radially extending bosses 22 containing holes 24, the axes of which are parallel to the central axis of the circular opening 20. The bearing means 18 comprise steel pins fixed in the holes 24 with portions extending therefrom in the direction of the output shaft 16. Internally of the stator within the opening 20 there is an internal gear 28 (FIG. 3) comprised of a plurality of teeth 30 secured to or formed on the inner surface. The teeth 30 are shorter in axial length than the axial length of the stator so that the ends of the teeth collectively form annular shoulders 32 spaced inwardly from each end.

The stator 10 is comprised of metal of suitable strength and the holes 24 are machined so that their axes are at precisely equal radial distances from the central axis of the opening 20 on a diameter passing through the centers of the bosses 22.

The rotor 12 is comprised of spaced parallel, circular plates 34, 36 joined together with spacer means therebetween as will appear hereinafter. The plate 34 contains a circular centrally located hole 34a and the shaft 14, which is the input shaft, extends through the hole 34a into the space between the plates and has on its inner end a spur gear 38. As illustrated, the spur gear is integral with the shaft 14; however, it may be a separate component and may be pinned or otherwise secured thereto. The plate 36 has at its inner side a centrally located bearing hole 36a for reception of a reduced end portion 14a of the shaft 14 and at its outer side the shaft 16, the latter being formed integral therewith. As illustrated the shaft 16 has a noncircular portion 16a; however it may be provided with any suitable configuration for making a connection.

The plates 34 and 36 are machined so that the centers of the holes 34a and the axis of the shaft 16 coincide with the central axis of the opening 20 and are adapted to be seated within the opening 20 in the stator upon the shoulders 32 and when seated thereon their outer surfaces are substantially flush with the ends of the stator. Peripherally spaced, axially extending spacers 42 (FIG. 4) are formed integral with the plate 34 at the inner side thereof and when the plates are mounted on the shoulders 32 the spacers 42, by engagement with the inner side of the plate 36, support the plates in spaced relation so that they cannot be drawn into binding engagement with the bearing shoulders 32. The spacers 42 contain threaded openings 44 and the plate 36 contains correspondingly located openings 46 through which bolts 48 are inserted and screwed into the plate 34 thereby to hold the plates of the rotor in the stator. Each of the plates contains a peripheral groove 50 (FIG. 3) for providing a lubricant tight seal between the rotor and the stator.

The portion of the shaft 14 which extends into the space between the plates 34 and 36, as related above, has on it the spur gear 38. Planetary gears 40 are mounted between the plates on pins 52 peripherally of the spur gear 38 and are of such diameter as to mesh with the spur gear and with the internal gear 28 on the stator. The pins 52 are removably secured at their ends in holes 54 formed in the inner sides of the plates 34 and 36 at equal radial distances from the central axis of the opening 20 and the shafts 14 and 16. The planetary gears 40 are mounted loosely on the pins but are constrained axially between the plates 34 and 36.

The plate 34 contains diametrically positioned recesses 56 (FIG. 4) concentric with two of the diametrically disposed holes 54 and washers 58 are mounted on the pins 52 in these recesses. The spur gear 38 and/or the shaft 14 adjacent the plate 34 contains an annular groove 60 which lies substantially in the plane of the recesses 56 and the washers 58 are of such diameter that portions extend inwardly therefrom into the groove 60. The washers 58 are constrained between the ends of the planetary gears 40 and the plate 34 and by engagement with the groove 60 constrain axial movement of the spur gear 38 and/or shaft 14.

The plates 34 and 36, shafts 14 and 16, spur gear 38, planetary gears 40 and supporting pins 52 rotate as a unit in the holder 10 and to transmit torque by means of this tool from the input shaft 14 to the output shaft 16 it is necessary to mount the tool adjacent the part to which the torque is to be applied and to hold the holder stationary. In contrast to prior devices of this kind, such as those referred to above, wherein a single lug or handle was employed to hold the tool stationary while applying the torque to the input shaft, the tool herein illustrated is provided with two bearings 18—18 diametrically disposed with reference to the axis of rotation of the input and output shafts, spaced at equal distances from this axis, parallel to each other and extending from the side of the holder from which the output shaft extends. These bearings, by engagement with complementary bearing means, for example, a pair of drilled holes h (FIG. 5) located at equal radial distances from the axis of the part P to which the torque is to be applied, counterbalance the torque couple acting through the center of the tool as indicated by the arrows X—X (FIG. 6), so that no side thrust is applied to the lateral faces of the spur and planetary gears such as to increase the frictional engagement between the gears and also balance bending perpendicular to the axis of the shafts as indicated at Y—Y (FIG. 7), so that there is no tendency to bias the axis of the gears in such fashion as to increase frictional engagement or to effect binding of the gears one with another. The bearings 18—18 are steel pins and are of sufficient cross-section to withstand the maximum torque and bending moment applied. The result of this counterbalancing of the applied forces both in torsion and in bending keeps the gears in free running engagement with each other, increases the efficiency of the multiplying unit as much as 15 to 20%, reduces the wear in the multiplying mechanism by eliminating side thrust and bending, increases the life of the tool, and adapts it to a greater variety of uses. By providing the equally spaced bearing pins described the amount of special tooling, weight, and the working radius of the tool may be reduced without impairing its capacity.

The tool herein illustrated was designed primarily as a chuck wrench to loosen and tighten large chucks, and, as illustrated in FIG. 5, the input shaft is provided with a handle bar 60. In place of the handle bar the shaft may be provided with a non-circular portion as is the shaft 16 for receiving a wrench or other manipulative device. Moreover, the tool may be used for other purposes as an assist where multiplying of the available input torque is necessary to achieve the desired result.

Optionally, the pins 18 may be omitted and the holes 24 left open to receive screw bolts 62, as shown in FIG. 8, or to enable placing the device over the projecting ends of a pair of pins or their equivalent already installed for this purpose.

The device as herein illustrated is admirably suited for cascading of several such devices thereby affording a means for obtaining an increased multiplication of output torque for a given input without having to build or purchase large size units. Two such devices cascaded for use are shown in FIG. 10 and are achieved by providing diametrically located holes 24a in the stator at the input side at the same radial distance from the axis of the shafts as the axes of the pins 18 and of such diameter as to receive the pins 18 of the device to be mounted on it. These holes 24a may be in addition to the holes 24 and may be located at any desired position about the axis of the shafts, or they may be empty portions of the holes 24 in which the pins 18 are fixed provided by cutting off portions of the pins 18, as shown in FIG. 9. To enable cascading two such devices the input shaft of one must be designed to non-rotatably receive the output shaft of the other.

I claim:

1. A torque transmitting tool comprising a holder of annular configuration containing an axial opening having intermediate and end portions of different diameter, the intermediate portion being situated between the end portions and being of smaller diameter than the end portions and in conjunction therewith providing axially spaced, parallel, annular shoulders, said intermediate portion having a plurality of teeth peripherally thereof and constituting an internal ring gear and said end portions having smooth surfaces, a rotor comprising a pair of circular end plates enough smaller in diameter than the end openings to freely turn therein and corresponding substantially in thickness to the axial depth of said end openings so that when positioned in said end openings the outer sides are substantially flush with the end faces of the holder, a plurality of spacer elements disposed at equally spaced intervals between the end plates, said spacers having an axial length appreciably longer than the axial length of the intermediate portion so that said plates are held spaced apart by said spacers a distance appreciably greater than the axial distance between said annular shoulders, said end plates and spacers containing holes for receiving bolts by means of which they are bolted to each other to turn as a unit within the holder, each plate also containing a central bearing hole and a plurality of peripheral bearing holes located on a circle concentric with its center, the holes in the respective plates being in axial alignment, bearing pins mounted in the peripherally located holes, a plurality of planet gears, one mounted on each pin in mesh with the internal ring gear, an input shaft mounted to turn in the center bearing hole of one end plate, said input shaft extending axially through the interior portion and having a reduced end portion journaled in the bearing hole in the other plate, and a sun gear keyed to the portion of the shaft extending through the interior portion in mesh with the planet gears, said end plates and gears rotating as a unit in response to rotation of the input shaft, said internal gears transmitting the rotation of the input shaft to said end plates solely by rolling contact of the gears with each other, an output shaft fixed to said other end plate to which rotation is imparted by rotation of the input shaft, and a pair of diametrically disposed pins fixed to the holder in parallel relation to each other and to the axes of the shafts, said pins projecting from at least one face of the holder.

2. A torque transmitting tool according to claim 1, wherein the axial length of the planetary and sun gears are less than the axial distance between the end plates.

3. A device according to claim 1, wherein said input shaft contains an annular groove at the inner side of the end plate through which it extends and there are two locking elements mounted diametrically opposite each other, one on each of two diametrically opposed pins on which are mounted planetary gears, said locking elements being held by said planetary gears against said end plate with portions projecting into said annular groove.

4. A device according to claim 3, wherein said locking elements are washers of such diameter that portions thereof extend into the groove in the shaft.

5. A torque multiplier according to claim 1, comprising first means on the holder located at equal radial distances from the axis of the input and output shafts operable to prevent rotation of the holder relative to the axis of the shafts during transmission of torque through the device, and a second means on the holder adapted to receive and support the first means of another such device to hold the latter with its output shaft in engagement with the input shaft of the first device thus to enable compounding two or more such devices.

6. A torque transmitter according to claim 1, comprising openings located diametrically opposite the axes of the shafts at equal radial distances from said axis, the longitudinal axes of which are parallel to said axes of the shafts, said openings extending all the way through the holder, said pins being mounted in said openings with portions extending therefrom in the direction of the output shaft, the portions of the pins situated in the openings being of lesser axial length than the axial length of the openings so that portions of the openings beyond the ends of the pins constitute sockets open at the input side of the device adapted to receive the projecting ends of the pins of another transmitter whereby two or more transmitters may be compounded to multiply the torque.

7. A torque multiplier according to claim 1, wherein the stator contains openings located diametrically opposite the axis of the shafts and at equal radial distances therefrom which correspond in radial distance to the distance of the first means from the axis of the shafts, said openings being adapted to receive said first means of another such multipler and to hold it with its output shaft engaged with the input shaft of the multiplier.

References Cited

UNITED STATES PATENTS

| 2,510,483 | 6/1950 | Schnepel et al. | 74—801 |
| 2,583,140 | 1/1952 | Else | 74—801 |
| 2,606,472 | 8/1952 | Curtis et al. | 81—57 |
| 2,826,095 | 3/1958 | Dirzius et al. | 74—801 X |
| 2,931,252 | 4/1960 | Ferguson et al. | 74—801 X |

FOREIGN PATENTS 929,238  6/1963  Great Britain.

ARTHUR T. McKEON, Primary Examiner

U.S. Cl. X.R.

81—57; 74—606